Jan. 30, 1951    J. J. MATCOVICH    2,539,788
SHIP'S LOG
Filed April 6, 1946
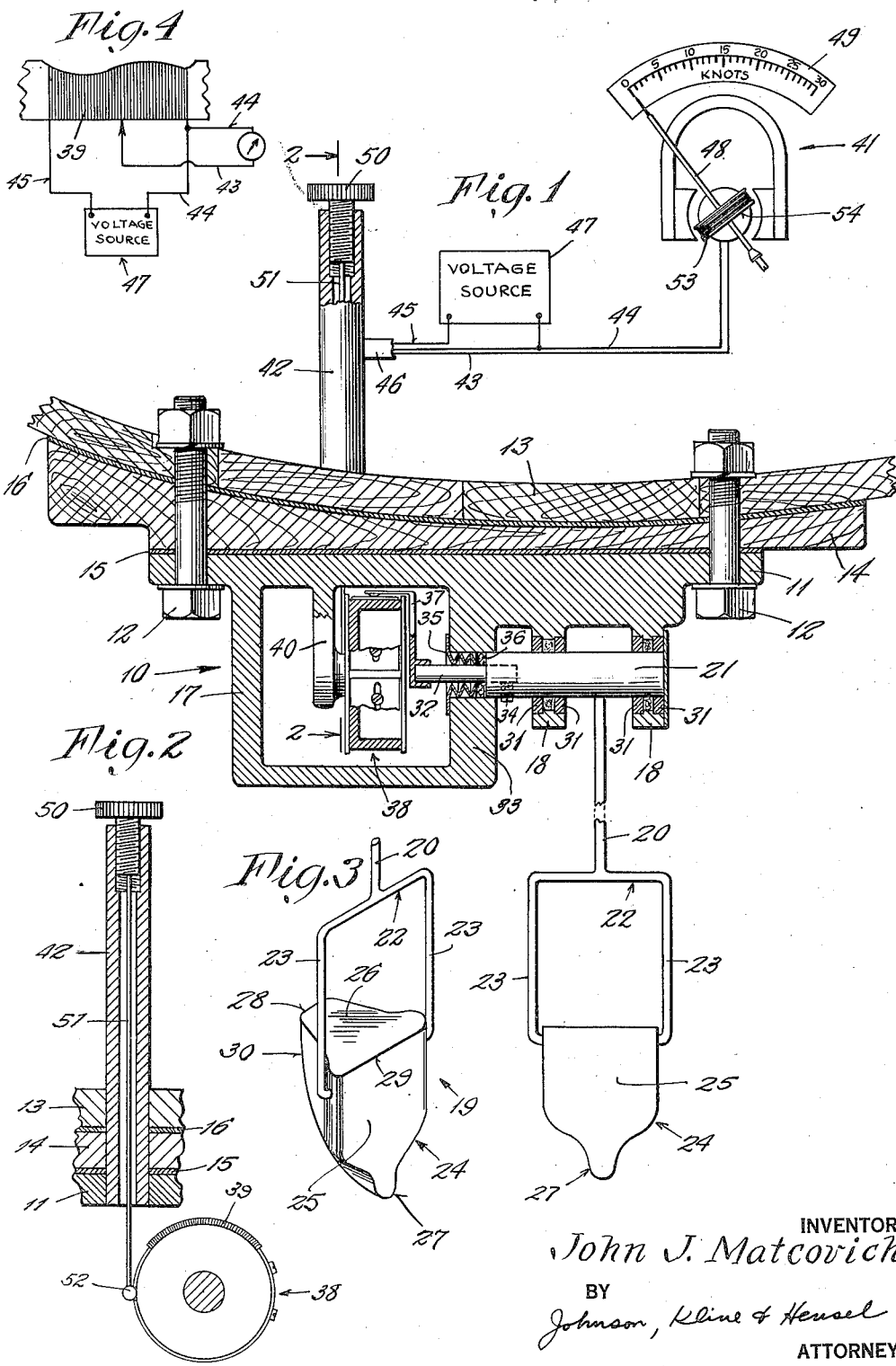
INVENTOR
John J. Matcovich
BY
Johnson, Kline & Hensel
ATTORNEYS Patented Jan. 30, 1951

2,539,788

UNITED STATES PATENT OFFICE 2,539,788

SHIP'S LOG

John J. Matcovich, Jackson Heights, N. Y.

Application April 6, 1946, Serial No. 660,035

13 Claims. (Cl. 73—186)

This invention relates to devices for indicating the speed of fluid flow, and more particularly to devices adapted for use with ships and known as "ship's logs," to indicate the speed of a ship by measuring the speed of the water past the ship's hull.

An object of the invention is to provide a fluid flow speed indicating device adaptable as a ship's log and which is extremely accurate and reliable over a protracted period and under various conditions of use. In accomplishing this object there is provided by the invention a novel vane and associated supporting and position-responsive control means so arranged that the vane is pivotally suspended in the fluid flow, the force of gravity on the vane constituting the sole means tending to hold the vane in the vertical, and the vane deflecting upward about the point of suspension under the force exerted by the said fluid flow on the vane. No reliance is placed on springs or other mechanical tensioning means acting on the vane for opposing the force of the fluid flow to return the vane to the vertical.

In the device of this invention, the vane reaches a position of equilibrium in which the moment produced by the force of gravity on the vane itself balances the moment produced by the force of the fluid flow on the vane. As the speed of the fluid changes, the position of the vane changes, and movement of the vane utilized to provide an indication of the speed of the fluid flow. Thus, the operation of the device is not subject to errors such as might be caused by fatigue of a spring, temperature changes, and other impairments to which mechanical tensioning devices are subjected, which factors could alter the position of equilibrium of a vane and thereby render the speed indication incorrect.

In the specific embodiment of the invention illustrated herein, a watertight casing is provided, to be mounted on the exterior of the hull of a ship, the said casing pivotally suspending a vane which is thus subjected to the flow of water past the ship's hull. The vane is carried in rugged, long-life bearings which are resistant to the action of sea water and are so constituted so as to introduce substantially no error, by their uniform friction, in the operation of the device. One of the pivots for the vane extends into the watertight casing through a low and uniform friction bellows-type packing, and is connected with a potentiometer to actuate the latter. Electrical conductors are brought through the casing and through the hull of the ship to an indicating instrument such as a galvanometer, which may be located at a remote point and calibrated to indicate knots. The construction and arrangement of the parts is such that the small amount of friction existing in the movable system of the vane has a substantially constant magnitude, and does not interfere with the accuracy of the device. Also, since the force of gravity is the sole means opposing the deflection of the vane from the vertical, springs and other mechanical tensioning devices being entirely absent, the response of the vane to various speeds of fluid flow is always constant and unvarying, and therefore the device is found to be extremely accurate and reliable under various conditions of use.

The galvanometer-type indicator of the device is characteristically of high accuracy, and by the use of well-known means for applying an absolutely constant voltage to the potentiometer, the combined control and indicating means of the device faithfully and without error responds to the different positions of equilibrium of the vane, thereby to maintain the accuracy of the indication at a high level.

Means are provided for adjusting the "zero" setting of the control and indicating system, the said means in the specific structure illustrated herein comprising an adjusting screw which alters the position of the resistance element of the potentiometer with respect to the potentiometer arm and connected vane.

Moreover, due to the utilization of the force of gravity to oppose the deflecting moment produced on the vane by the fluid flow, thus obviating the use of springs and other mechanical tensioning devices with their accompanying adjustment, temperature compensation means, etc., the vane and potentiometer control carried in the watertight casing may be of extremely simple construction, thereby effecting a saving in the fabrication of the parts and in their assembly.

A feature of the invention is the ease with which the device may be installed and put into condition for operation. It is merely necessary to provide relatively small mounting holes in the hull of the vessel for receiving bolts by which the watertight casing is secured to the hull, and to provide a relatively small hole through which the adjustment screw and conduit carrying the latter and the electrical conductors may pass so as to project into the hold of the vessel. By use of a simple gasket or pad, the attaching of the casing to the vessel's hull automatically seals the holes made therein, so that there is no difficulty with leakage or seepage of water into the vessel. The entire device of this invention is calibrated at the time of manufacture, so that after installing the casing on the vessel and connecting the conductors to the indicating instrument located on the vessel's bridge, it is merely necessary to regulate the "zero" adjustment of the potentiometer, whereupon the device is in readiness for use without further adjustment or calibration.

Another feature of the invention is the provision of a ship's log as above in which the graduations of the indicating instrument are uniformly spaced from each other and indicate regular gradations of speed, thereby enabling readings of the instrument to be easily and quickly made. In accomplishing this, the card of the potentiometer which carries the resistance element has a varying width, the edge of the card being formed to a predetermined curve which takes into consideration the deflection characteristics of the particular vane being used, so that the non-uniform increments in the deflection of the vane result in uniform increments being manifested in the pointer and dial of the galvanometer.

Another object of the invention is to provide a gravity-controlled ship's log as above, in which means are provided to minimize the effects of pitching or rocking of the vessel on which the log is installed, thereby resulting in the pointer of the galvanometer remaining substantially steady to indicate the correct speed of the ship. This is accomplished, in the specific embodiment of the invention illustrated, by electrical damping of the galvanometer movement, in conjunction with the locating of the vane approximately below the center of pitch of the vessel, and by this arrangement the needle of the galvanometer is prevented from oscillating or swinging back and forth under most conditions encountered in use.

Other features and advantages will hereinafter appear.

In the accompanying drawings, which illustrate one specific embodiment of the invention:

Figure 1 is a transverse section taken through the watertight casing of the device, mounted on the hull of a ship, the vane being shown in front elevation, and the indicating means, voltage source, and connections therefor being shown schematically.

Fig. 2 is a section taken on the line 2—2 of Fig. 1, showing the "zero" adjustment of potentiometer.

Fig. 3 is a perspective view of a lower portion of the vane of the device, and

Fig. 4 is a view showing the development of the potentiometer card.

Referring to Fig. 1, the portion of the ship's log device of this invention which is attached to the exterior of the vessel comprises a watertight casing 10 which may be conveniently formed of a casting of Monel or other corrosion-resistant metal, the casing having a substantially flat base 11 secured by bolts 12 to the underside of the hull 13 of the vessel. Where the hull 13 has a considerable curvature as shown, a pad 14 of wood, metal or other suitable material may be interposed between the base 11 and the hull 13, together with suitable gaskets 15 and 16. If the hull 13 is substantially flat, the base 11 of the casing 10 may be made to closely fit the exterior of the hull, with the interposition of but a single gasket such as the gasket 15. A sufficient number of bolts 12 are provided to secure the casing 10 to the hull 13 at a plurality of places so as to effectively prevent leakage or seepage of water into the hull. The casing 10 has a hollow depending portion or housing 17 integral with the base 11, and at one side of the housing 17 the base has a pair of depending trunnions 18.

A novel vane 19 is pivotally mounted in the trunnions 18, so as to be suspended from the casing 10 and be acted upon and deflected from the vertical by the flow of water past the casing, and in accordance with the invention the force of gravity on the vane 19 is the sole means for opposing the deflection thereof, the said force tending to continually urge the vane, when deflected, to the vertical position. The vane 19 comprises a depending arm 20 at its upper end secured to a pivot or shaft 21 which bears in the trunnions 18, the lower end of the arm 20 being rigidly connected with a fork 22 having depending arms 23. A body 24 is rigidly secured to the extremities of the arms 23 to depend therefrom, the said body having a front face 25 which is substantially parallel to the plane of the arms 23, and having a top face 26 which extends transversely of the vane and is substantially perpendicular to the face 25.

The vane 19 is formed of a non-corrosive metal such as Monel, and the arms 23 of the fork 22 may be welded, brazed or otherwise rigidly secured to the body 24.

Preferably, as shown, the front face 25 of the body 24 is tapered and brought to a point 27 at its lower end, and the top face 26 is made generally tapering toward the rear, terminating in a relatively short edge 28. The surfaces 25 and 26 of the body meet each other at the front top edge 29, and the body has a curved rib 30 at the rear thereof, extending from the point 27 to the rear edge 28 of the top surface, the rib being broader at its top portion than at its bottom portion.

The vane 19 is thus pivotally mounted to hang from the casing 10 and be deflected rearwardly in response to the force of the water flowing rearwardly past the casing.

According to the construction shown, when the vane 19 is vertical the flow of water will strike the front surface 25 of the body, and as soon as the vane is deflected backward, the surface 26 of the body will have a deflection-opposing force exerted on it by the flow of the water. Thus, a pair of opposing moments is set up as a result of the water flow striking the faces 25 and 26. The force of gravity on the vane 19 also sets up a moment which tends to restore the vane to the vertical, the said gravitational moment thereby aiding the moment involving the surface 26, and opposing the moment involving the surface 25. As a result, the vane 19 will, for any given rate of flow of water past the casing 10, come to rest in a position of equilibrium where the gravitational moment is opposed and balanced by the resultant moment of the force of the water on the surfaces 25 and 26 of the body 24. A small additional moment is set up by the force of the water on the arm 20 and fork 22 of the vane, this moment aiding the moment involving the surface 25 and tending to increase the deflection of the vane.

The purpose of having the surfaces 25 and 26 oppose each other is to prevent the vane 19 from at any time being deflected through an excessively great angle, approaching a right angle. Such excessive deflection is opposed by the weight of the body 24, and by the force of the water flowing against the top surface 26 of the body when the vane deflected.

It will be noted that by virtue of the body 24 being carried by the fork arms 23, turbulence of the water striking the top surface 26 of the body is avoided to a considerable degree.

Also, by the provision of the rib 30 extending from the tip 27 of the body 24 rearward and upward to the top rear edge 28 thereof, turbulence is minimized in the water which flows past the body while the latter is in a deflected position of equilibrium.

Preferably the vane 19 is coated with a plastic paint having the property of inhibiting sea growth so that the deflection characteristics of the vane are not altered during extending use of the device.

In order to provide for uniform and small frictional load or drag on the vane 19 at the trunnions 18, according to the present invention plastic bushings 31 are mounted in the trunnions, the said bushings being of a substance resistant to the action of sea water, and to wear.

For the purpose of actuating a control device which will be responsive to the positioning of the vane 19, the shaft 21 carrying the vane has a reduced extension 32 passing through the side wall 33 of the housing 17, the extension being carried in a central bore in the shaft 21 and being secured by a set screw 34. A seal is provided around the shaft extension 32, in the form of a bellows 35 and packing 36. At its inner end the shaft extension 32 mounts an arm 37 of a translating device such as a potentiometer 38 the resistance element 39 of which is rotatably carried by a depending arm 40 within the housing 17.

According to this construction, rearward deflection of the vane 19 from the vertical will advance the potentiometer arm 37 over the resistance element or card 39 of the potentiometer, and this operation is utilized to actuate an indicating galvanometer 41 which may be located at a remote point from the casing 10 and vane 19, the bridge of the vessel being commonly the preferred location for the galvanometer.

For the purpose of bringing out conductors from the potentiometer 39 to the galvanometer 41, and also to provide a convenient means for adjusting the "zero" setting of the potentiometer, the casing 10 has an upstanding tubular member or conduit 42 which passes through the pad 14 and hull 13 of the vessel and extends upwardly within the hull for a short distance. Lead wires 43, 44 and 45 are brought from the potentiometer through the member 42 and through a cable conduit 46 secured to the member, the latter two wires being connected with the extremities of the potentiometer card, and the wire 43 being connected with the potentiometer arm 37.

The wires 43 and 44 are carried and connected to the galvanometer 41, and the wires 44 and 45 are connected to a voltage source 47 which is preferably electronically controlled so as to be maintained at an absolutely constant value.

It will be seen that, according to the above arrangement, deflection of the vane 19 will result in deflection of the galvanometer 41. The potentiometer resistance element or card 39 is preferably so shaped, as shown in Fig. 4, and the voltage supply 47 is so adjusted, with respect to the deflection characteristics of the vane 19, that: 1, the full scale of the galvanometer is covered by the needle 48 thereof for positions of equilibrium of the vane 19 between the vertical and the full-deflection position of the vane; 2, when the galvanometer scale 49 is laid out to read knots, the intervals or spaces between consecutive values or readings will be uniform. As a result of this arrangement, readings of the scale 49 may be quickly and easily made.

The "zero" adjustment of the potentiometer 38 is accomplished by a screw 50 threaded into the top of the tubular member 42, the said screw being connected to a link rod 51 which is pivotally secured by means of a ball and socket connection 52 to the potentiometer 38. Adjustment of the screw 50 will rotatably adjust the card 39 and thereby enable the "zero" setting of the galvanometer 41 to correspond with the vertical position of the vane 19.

It will be noted that no springs or other mechanical tensioning devices are incorporated in the device of this invention to oppose the force of water flowing against the vane 19, dependence being placed for this purpose entirely on the gravitational force exerted on the vane. Thus, temperature changes will have no effect whatsoever on the gravitational or restoring force of the vane, and the accuracy of the latter in indicating the speed of the vessel will not be impaired. Moreover, factors such as fatigue and breakage of springs, or failure of other mechanical tensioning devices are not involved in the indicator of this invention, and therefore these factors cannot impair the accuracy of the indications.

The force of gravity on the vane 19 is substantially constant and unvarying, and the retarding frictional forces acting on the vane 19, such as the forces in the trunnions 18, packing 36 and potentiometer 38 are uniform, and are relatively small as compared with the restoring gravitational force on the vane 19, and compared with the deflecting force of the water on the vane, so that the accuracy of the device of this invention is extremely high. Moreover, by close control of the voltage source 47, and by the use of an accurate galvanometer 41, the indications of the galvanometer resulting from actuation of the potentiometer control 38 are extremely faithful, so that the overall accuracy of the device is consistently good.

The casing 10 is preferably located between the bow and stern of the vessel at a point approximately below the center of pitch of the vessel so as to minimize the effect of rolling and pitching on the vane 19. This helps to maintain the galvanometer needle 48 steady, and for this purpose also the galvanometer is preferably damped, such as by winding the coil 53 of the instrument on a metal bobbin 54 which latter, interacting with the magnetic field of the instrument, provides an effective electrical damping.

It will be appreciated that the vane 19 of the present indicating device is extremely simple and foolproof, and therefore not likely to get out of order. The potentiometer 38 may be made of rugged construction so that it will withstand continued long usage without appreciable wear or need for adjustment. Also the plastic bearings 31 in the trunnions 18 are so designed that they have a considerable period of useful life. Therefore, the parts of the device carried on the exterior of the hull 13 of the vessel will operate over an extended period without requiring adjustment or repair.

Those parts of the device, such as the voltage supply 47 and meter 41, which are more subject to variation and maladjustment, are readily accessible so that they may be quickly and without difficulty reached for repair.

By use of a suitable indicating instrument 41 the voltage from the source 47 may be alternating instead of direct, if desired.

It will be seen that the casing 10 projects but a very slight amount from the hull 13 of the vessel, and therefore it will clear practically all obstructions over which the vessel may pass, except those obstructions which are so high as to cause the hull of the vessel to ride on them. Lesser or lower obstructions, which might yet lie in the path of the vane 19, will do no damage to the latter since they will merely sweep the vane backward and upward until it clears the obstruction, whereupon it will again drop to its position of equilibrium.

The casing 10 and vane 19 may be quickly and easily installed on a vessel, since it is merely necessary to drill a number of comparatively small sized holes in the hull of the vessel and mount the casing, with suitable gaskets, by means of the bolts 12.

At the time of manufacture, the deflection characteristics of the vane 19 are matched with the characteristics of the potentiometer 38 and galvanometer 41 so that, for a given voltage applied to the potentiometer, the needle of the galvanometer will accurately translate the deflection of the vane into knots. This calibration, once determined, need never be altered throughout the life of the indicating device, and thus when installing the device the only adjustment which need be made is the "zero" adjustment effected by turning the screw 50. As a result the device may be quickly made operative after installation merely by connecting the necessary wires between the galvanometer 41, voltage source 47 and potentiometer 38. No adjustment of springs or the like is required, either at the time of installation or at any subsequent time.

It will be appreciated that the parts of the device are of simple construction, and that the assembly of the parts may be quickly carried out, so that manufacturing costs are held to a minimum.

The indicating instrument or log of the present invention has a number of advantageous uses, on either large or small vessels. It may be referred to in connection with the navigation of a vessel. It is also useful on sailing vessels, for instance, to indicate the best set of the sails. Or, if the device is installed on a commercial fishing boat, it will indicate the amount of drag of the nets, and therefore the extent of the "catch," in addition to the above uses.

Variations and modifications may be made within the scope of this invention and portions of the improvements may be used without others.

I claim:

1. A fluid speed indicator device for ships, comprising a housing adapted to be secured to the ship's hull below the waterline; a translating device in said housing, having a movable part; a vane; means pivotally mounting the vane on the housing to extend therefrom into the fluid flowing past the hull whereby the vane will be deflected by said fluid, the position of equilibrium of the vane being determined by balance of the moment created solely by the weight of the vane itself with the moment created by the force of the fluid on the vane; means passing through the housing, actuating the movable part of the translating device in response to movement of said vane; means sealing the interior of the housing from the fluid outside the ship's hull at the point where the immediately preceding means passes through the housing; indicator means connected with said translating device, providing a reading of the speed of the fluid as determined by the deflection of the vane; means including a manually movable member located exteriorly of said housing and including a link passing through the housing and connecting the member to the translating device, providing for adjustment of said translating device to conform the reading of the indicator means with the fluid speed; and means for sealing the housing to the ship's hull at the point where the link passes through the housing.

2. In a fluid speed indicator, a vane pivotally suspended to hang into the fluid flow and to deflect upward about the point of suspension under the force exerted on the vane by the said flow, the vane having solely two relatively angularly disposed surfaces in the fluid flow, one of said vane surfaces lying substantially in a plane containing the pivotal axis of the vane and the other extending in a direction transverse with respect to said plane and substantially normal thereto to cause unequal opposed turning moments on the vane, and the position of equilibrium of the vane being determined by balance of the moment created solely by the weight of the vane itself with the moment created by the force of the fluid on the surfaces of the vane.

3. In a fluid speed indicator, a vane, including an arm pivotally suspended to hang into a generally horizontal fluid flow and to deflect upward about the point of suspension to a downwardly extending position of equilibrium under the force exerted on the vane by the said flow, the vane having a pair of relatively angularly disposed surfaces in the fluid flow, located below the pivot of the arm and remaining wholly below the pivot for all positions of equilibrium of the arm, said surfaces being adapted to cause unequal opposed turning moments on the vane.

4. In a fluid speed indicator, a vane pivotally suspended to hang into the fluid flow and to deflect upward about the point of suspension under the force exerted on the vane by the said flow, the vane including a body having a surface disposed at the front of the body and having an upper surface on the body, the front surface lying substantially in a plane containing the pivotal axis of the vane and the upper surface extending in a direction transverse with respect to said plane and substantially normal thereto to cause unequal opposed turning moments on the vane when the latter is inclined from the vertical and in a position of equilibrium.

5. In a fluid speed indicator, a vane pivotally suspended to hang into the fluid flow and to deflect upward about the point of suspension under the force exerted on the vane by the said flow, the vane including a body having a surface disposed at the front of the body and having an upper surface on the body smaller than the first, the said surfaces being disposed to cause unequal opposed turning moments on the vane when the latter is inclined from the vertical and in a position of equilibrium.

6. In a fluid speed indicator, a vane pivotally suspended to hang into the fluid flow and to deflect upward about the point of suspension under the force exerted by the said flow, the vane including a body having a generally triangular front surface and having a second generally triangular top surface, the said surfaces being disposed to cause unequal opposed turning moments on the vane when the latter is inclined from the vertical and in a position of equilibrium; and indicating means responsive to the positioning of the vane.

7. In a fluid speed indicator, a vane pivotally suspended to hang into the fluid flow and to deflect upward about the point of suspension under the force exerted by the said flow, the said vane comprising an arm extending downwardly from the point of suspension and having a fork at its lower end, and comprising a body rigidly secured to the ends of the fork, the body having front and upper relatively angularly disposed surfaces in the fluid flow, located to cause unequal opposed turning moments on the vane when the latter is inclined from the vertical, one of the said surfaces being substantially parallel, and the other surface substantially perpendicular to the plane of the fork, and the said surfaces extending closely adjacent each other at the ends of the fork.

8. In a fluid speed indicator, a vane pivotally suspended to hang into the fluid flow and to deflect upward about the point of suspension under the force exerted by the said flow, the said vane comprising an arm extending downwardly from the point of suspension and having a fork at its lower end, and comprising a body rigidly secured to the ends of the fork, the body having front and upper relatively angularly disposed surfaces in the fluid flow, located to cause unequal opposed turning moments on the vane when the latter is inclined from the vertical.

9. A ship's log comprising a watertight casing adapted to be secured to the exterior of the hull of a ship to lie wholly below the waterline; a vane pivotally suspended from the casing to hang into the water and deflect upward about the point of suspension under the force exerted by the water flow on the vane, the position of equilibrium of the vane being determined by balance of the moment created solely by the weight of the vane itself with the moment created by the force of the water flow on the vane; a control means within the casing, actuated in response to movement of the vane; an indicating device adapted to be actuated by the said control means; means passing through the casing for connecting the said control means with the indicating device, the latter being located at a point remote from the said casing; means, including a movable member mounted exteriorly of said casing for location within the ship's hull, and including a link passing through the casing and connecting the member to the control means, for adjusting said means to conform the reading of the indicating device with the speed of the water flowing past the vane; and means for sealing the casing to the ship's hull at the point where the link passes through the casing.

10. A ship's log comprising a watertight casing adapted to be secured to the exterior of the hull of a ship to lie wholly below the waterline; a vane having two angularly-disposed surfaces, pivotally suspended from the casing to hang into the water and deflect upward about the point of suspension under the force exerted by the water flow on the vane, one of said vane surfaces lying substantially in a plane containing the pivotal axis of the vane and the other extending in a direction transverse with respect to said plane and substantially normal thereto whereby the position of equilibrium of the vane is determined by balance of the moment created solely by the weight of the vane itself with the moment created by the force of the water flow on the two surfaces of the vane; electrical control means within the casing, actuated in response to movement of the vane; indicating means adapted to be actuated by the said electrical control means; and electrical conductors passing through the casing for connecting the said control means with the indicating means, the latter being located at a point remote from the said casing.

11. A ship's log comprising a watertight casing adapted to be secured to the exterior of the hull of a ship to lie wholly below the waterline; a vane pivotally suspended from the casing to hang into the water and deflect upward about the point of suspension under the force exerted by the water flow on the vane, the position of equilibrium of the vane being determined by balance of the moment created solely by the weight of the vane itself with the moment created by the force of the water flow on the vane; electrical control means within the casing, actuated in response to movement of the vane; indicating means adapted to be actuated by the said electrical control means; electrical conductors passing through the casing for connecting the said control means with the indicating means, the latter being located at a point remote from the said casing; means connected to the said control means and including a manually operable part disposed remote from the casing and a link passing through the casing and connecting the part and control means, for altering the setting of the control means with respect to the vane; and means for sealing the casing to the ship's hull at the point where the link passes through the casing.

12. A ship's log comprising a watertight casing adapted to be secured to the exterior of the hull of a ship to lie wholly below the waterline; a vane pivotally suspended from the casing to hang into the water and deflect upward about the point of suspension under the force exerted by the water flow on the vane, the position of equilibrium of the vane being determined by balance of the moment created solely by the weight of the vane itself with the moment created by the force of the water flow on the vane; a potentiometer within the casing, actuated in response to movement of the vane; indicating means adapted to be actuated by the said potentiometer; electrical conductors passing through the casing for connecting the potentiometer with the said indicating means, the latter being located at a point remote from the said casing; an adjusting screw within the hull, a link connected to the potentiometer and said screw and passing through the casing for altering the setting of the potentiometer with respect to the vane while the ship is in motion; and means for sealing the casing to the ship's hull at the point where the link passes through the casing.

13. A ship's log comprising a watertight casing adapted to be secured to the exterior of the hull of a ship to lie wholly below the waterline; a vane pivotally suspended from the casing to hang into the water and deflect upward about the point of suspension under the force exerted by the water flow on the vane, the position of equilibrium of the vane being determined by balance of the moment created solely by the weight of the vane itself with the moment created by the force of the water flow on the vane; a potentiometer within the casing, having an arm actuated in response to movement of the vane; indicating means adapted to be actuated by the said potentiometer; electrical conductors passing through the casing for connecting the potentiometer with the indicating means, the latter being located at a point remote from the said casing; and adjusting means within the hull, connected to the resistance element of the potentiometer and passing through the casing for altering the setting of the element with respect to the said vane and arm while the ship is in motion.

JOHN J. MATCOVICH.

REFERENCES CITED

The following references are of record in the file of this patent:

UNITED STATES PATENTS

| Number | Name | Date |
| --- | --- | --- |
| 14,328 | Thompson | Feb. 26, 1856 |
| 375,201 | Schaufuss | Dec. 20, 1887 |
| 2,025,830 | Rosmait | Dec. 31, 1935 |
| 2,040,305 | Graham | May 12, 1936 |
| 2,080,554 | Wollf | May, 18, 1937 |
| 2,198,055 | Liner | Apr. 23, 1940 |
| 2,272,128 | Osbourne | Feb. 3, 1942 |
| 2,423,603 | McCaudless | July 8, 1947 |